March 24, 1925. 1,530,886
H. J. GORA
PORTABLE POWER DRIVEN TOOL
Filed Oct. 26, 1923 2 Sheets-Sheet 1
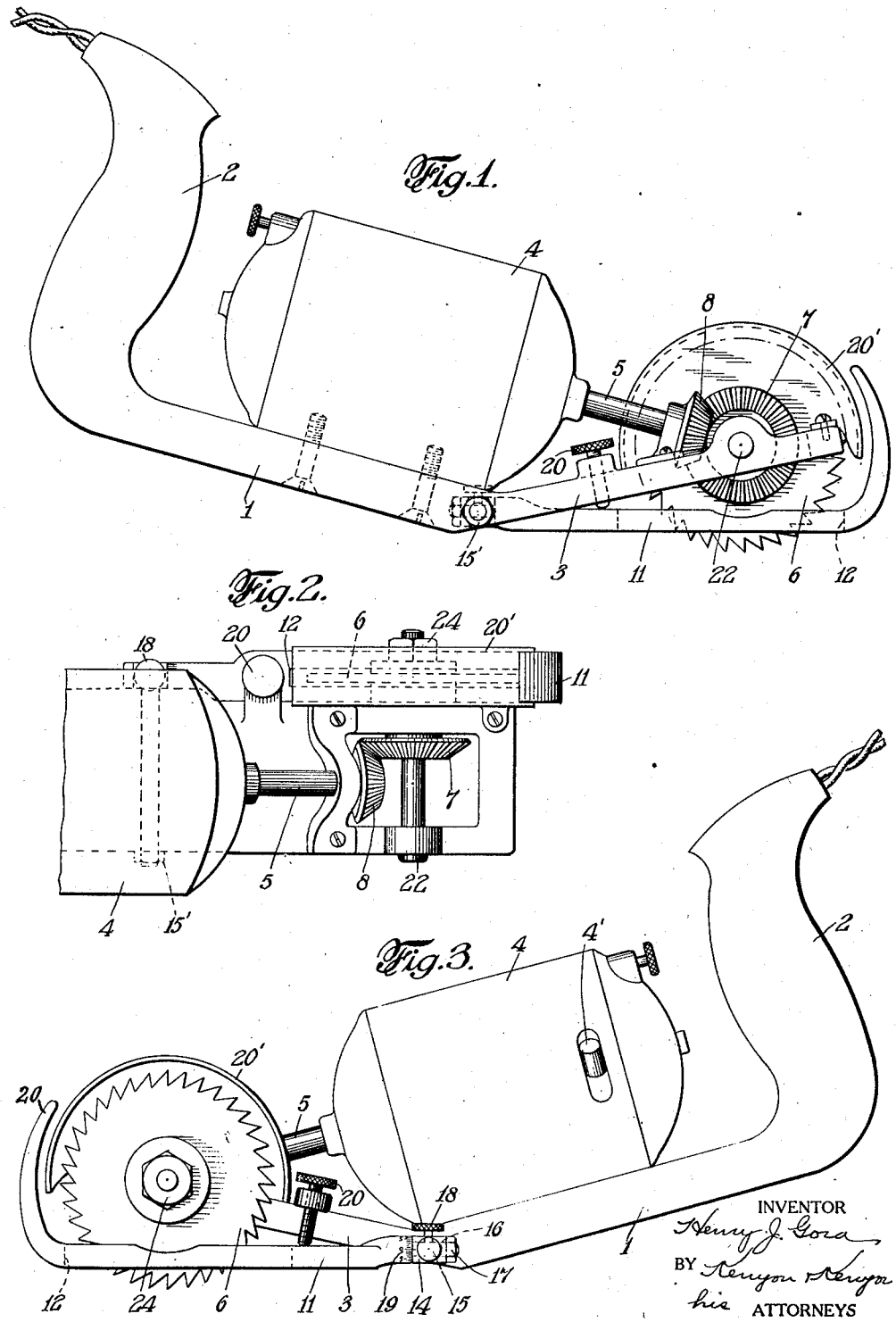

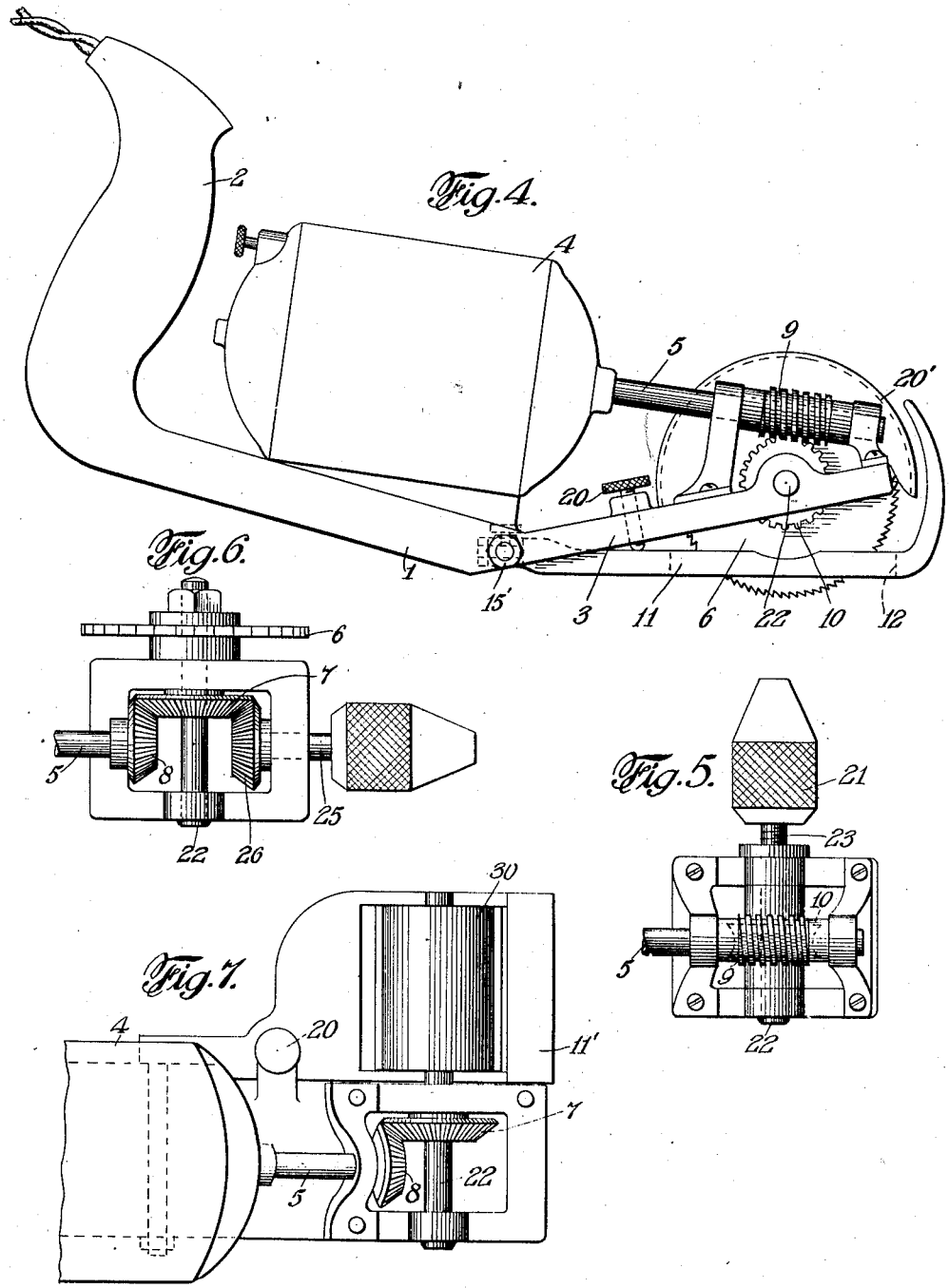

Patented Mar. 24, 1925.

1,530,886

UNITED STATES PATENT OFFICE.

HENRY J. GORA, OF JERSEY CITY, NEW JERSEY, ASSIGNOR OF TWO-NINTHS TO HENRY REMMER, OF W. SAYVILLE, NEW YORK, TWO-NINTHS TO FREDERICK C. MEYER, OF BROOKLYN, NEW YORK, AND TWO-NINTHS TO EUGENE MARRYATT, OF BROOKLYN, NEW YORK.

PORTABLE POWER-DRIVEN TOOL.

Application filed October 26, 1923. Serial No. 670,817.

*To all whom it may concern:*

Be it known that I, HENRY J. GORA, a citizen of the United States, residing at Jersey City, in the county of Hudson and State of New Jersey, have invented new and useful Improvements in Portable Power-Driven Tools, of which the following is a specification.

My invention relates to tools and more particularly to a portable power driven tool such as a saw. One of the objects of the invention is to provide a device of this character which is simple in construction and efficient in operation. Other objects, advantages and features will appear more fully in the following detailed description and appended claims.

The accompanying drawings forming a part of this specification illustrate several embodiments of the invention.

Referring to the drawings,

Figure 1 is a side elevation of one embodiment of the invention.

Figure 2 is a fragmentary plan view thereof.

Figure 3 is a side elevation of the same viewed on the opposite side from that shown in Fig. 1.

Figure 4 is a side elevation of another embodiment of the invention; and

Figures 5, 6 and 7 are fragmentary plan views of modifications.

Referring to Figs. 1 to 4 inclusive, an integral frame of suitable material, such as steel or aluminum, comprises a base portion 1, a handle portion 2 projecting upwardly from the rear of the base portion and a portion 3 extending upwardly from the forward end of the base portion 1 at an obtuse angle thereto. Secured to the portion 1 of the frame is a suitable motor 4 which, as shown, is an electric motor having its shaft 5 extending longitudinally of the frame parallel to the base portion 1 and at an acute angle to the inclined portions 3 of the frame. A suitable tool, which in Figs. 1 to 4 inclusive is in the form of a rotatable saw 6, is supported by the portions 3 of the frame and driven from the motor shaft 5.

In the form of invention shown in Figs. 1, 2 and 3, the saw 6 is mounted with its axis of rotation intersecting and at right angles to the axis of shaft 5. The saw is secured to a beveled gear 7 which is driven by a beveled gear 8 secured to the shaft 5. It is generally desirable to run the saw 6 at a slightly lower angular velocity than the shaft 5; and the gearing 8, 7 is accordingly preferably speed reducing gearing, the gear 8 being smaller than the gear 7. The motor is provided with a well known type of switch 4' by which the motor shaft may be caused to rotate in either direction or stopped. When the operating member is in mid position the motor will be stopped. When the said member is at one end of the slot the motor shaft will rotate in one direction, and vice versa. The construction shown in these figures is designed primarily for the cutting of materials, such as wood.

Where it is desired to cut harder materials, such as metal, it is desirable to very materially reduce the angular velocity of the saw below that of the shaft 5 and also to provide the saw with a considerable amount of power. I accordingly preferably employ for these conditions a construction such as shown in Fig. 4 in which the saw 6 is driven by suitable worm gearing comprising, for example, a worm 9 secured to the shaft 5 and a worm wheel 10 to which the saw is secured.

In order to regulate the depth of cut of the saw I preferably provide a gage 11 which, as shown, is hinged at the intersection of the parts 1 and 3 of the frame. The gage is provided with a rectangular opening 12 through which the saw blade passes. The gage mounting, as shown, permits not only adjustment of the gage to provide for different depths of cut but also an adjustment of the gage for cutting miters. The mounting shown comprises a block 14 which is mounted upon the frame by a pivot 15 so as to be movable about a horizontal axis parallel to the axis of rotation of the saw. By tightening the nut 15', the block 14 secured to the pivot 15 as well as the gage (which is carried by the said block) may be fastened with the desired amount of friction against movement about the axis of pivot 15. The gage is provided with a longitudinal pivot portion 16 which passes through the block 14 and is provided at its outer end with suitable securing means, such as the nut 17, for preventing longitudinal displacement of the gage from the block 14. The axis of the portion 16 preferably extends parallel to the surface of the saw and approximately through the center of the saw opening 12 of the gage; so that angular movement of the gage about the axis of the part 16 will not be interfered with by engagement between the saw and the gage. The gage may be held against such angular movement with respect to the block 14 by suitable means such as the set screw 18. To facilitate adjustment of the gage to any desired angular position about the axis of the part 16 suitable graduations, as at 19, may be provided. To limit the upward movement of the gage 11 with respect to the frame 1 and thereby determine the depth of cut, suitable adjustable means, such as screw 20, arranged to bear on the top of the gage may be provided. By means of this screw 20 the gage may be adjusted about the pivotal axis 15 without loosening nut 15 when the latter is not drawn up too tight. It will be seen that the mounting of the gage is such that it may be adjusted to a position in close proximity to the axis of the saw so as to permit the use of a comparatively small saw for a given depth of cut. The frame also is so constructed as not only to afford suitable means for supporting the motor but also to offer no obstruction to the cutting by the saw to a depth approximately equal to its radius. The resulting adaptability of the device to the use of small saw blades results in a very light construction requiring but small power.

The gage 11 is preferably provided with a curved upwardly extending portion concentric with the saw blade and serving with the body of the gage to cover the edge of the saw when the gage is in lower or inoperative position thus serving as a guard to prevent injury by the saw. A guard 20' secured to the portion 3 of the frame covers the upper portion of the saw.

In use when it is desired to cut to a desired depth the screw 20 is adjusted to position the gage so that the saw projects below the gage an amount equal to the desired depth. The saw is applied to the material to be cut and started into operation, the gage 11 acting as a support for the tool after the saw has cut to the desired depth. The tool may now be moved longitudinally to make a cut of this depth of desired length, the gage 11 flat resting on the work and determining the depth of cut. In such use the body part 1 of the frame and the handle 2 thereof will be inclined at an angle to the work. When it is desired to make a miter cut, the set screw 18 is loosened and the gage adjusted about the axis of part 16 to a suitable position as determined by the graduations 19, whereupon the screw 18 is again set to hold the gage in proper position with respect to the block 14. The proper cut is now made with the gage 11 resting flat upon the work and thereby determining the proper angular position of the saw 6 with respect to the work.

Instead of a saw such as 6 other tools may be employed. For example in Fig. 5 I have shown a chuck 21 adapted to hold a drill bit. To permit the interchangeability of the tools the tool shaft 22 is provided with an overhanging portion 23 on which the tools, such as the saw or the drill chuck, may be detachably secured. To this end the overhanging portion of the shaft 22 may be threaded to enable the drill chuck to be threaded thereon or to coact with a nut 24 (see Fig. 3) to secure the saw to the shaft against a shoulder on the shaft.

Instead of securing the drill chuck to the transverse saw supporting shaft 22, a separate shaft 25 may be provided therefor. This shaft 25, as shown in Fig. 6, extends longitudinally of the frame and has secured thereto a bevel gear 26 by which the shaft is driven from the bevel gear 7 on the saw shaft 22. In other respects the machine is the same as that shown in Figs. 1, 2 and 3.

In Fig. 7 I have shown my improved device provided with a rotatable planing tool 30 secured to and driven by the shaft 22. In this device, the gage 11' is of considerable width and is mounted for movement toward and away from the axis of the tool but not for movement at an angle to such axis.

While I have described several embodiments of my invention it is to be understood that my invention is not limited to the details or modifications shown.

Having thus described my invention, what I claim as new and desire to secure by Letters Patent is:—

1. A portable power driven saw comprising a frame, a motor carried by said frame, a saw carried by said frame and driven by said motor, a gage pivoted to said frame for movement about an axis in the cutting plane of said saw, and releasable means for holding said gage against such pivotal movement.

2. A portable power driven tool comprising a frame, a motor carried by said frame, a cutter carried by said frame and driven by said motor, a gage connected to said frame by means of a universal joint and traveling over the work therewith, with the advance of the tool, and means for securing said gage rigidly in any of its operative positions.

3. In a portable power driven tool, the combination of a frame, a motor supported thereby and having a shaft extending longitudinally of the frame, a rotary tool arranged with its axis at right angles to said shaft, means for driving said tool from said shaft, said frame having a portion extending longitudinally of said shaft at an angle thereto for supporting said tool, and an adjustable gage pivoted to said frame at the junction of said angular extension and frame and movable toward and from a position coinciding with that of the extension.

4. A portable power driven tool comprising a frame supporting a motor and a rotary cutter driven thereby, a guiding shoe or gage to engage the work and pivotally connected to the frame in a manner to govern the depth of the cut and also the plane of rotation of the cutter.

In testimony whereof, I have signed my name to this specification.

HENRY J. GORA.